United States Patent
Bhattacharya et al.

(10) Patent No.: US 11,362,977 B2
(45) Date of Patent: Jun. 14, 2022

(54) METHOD AND SYSTEM FOR PRIORITIZING COMMUNICATIONS RESPONSES

(71) Applicant: Dell Products L. P., Round Rock, TX (US)

(72) Inventors: Abhijeet Bhattacharya, Bangalore (IN); Sachin Kumar, Bangalore (IN); Ankit Bansal, Bangalore (IN); Rajeev Arakkal, Bangalore (IN); Karthik Prabhu K, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/178,169

(22) Filed: Nov. 1, 2018

(65) Prior Publication Data
US 2020/0145357 A1    May 7, 2020

(51) Int. Cl.
*H04L 12/58* (2006.01)
*H04L 51/00* (2022.01)
*G06Q 30/02* (2012.01)
*G06Q 50/00* (2012.01)
*G06F 16/27* (2019.01)
(Continued)

(52) U.S. Cl.
CPC .......... *H04L 51/14* (2013.01); *G06F 16/2228* (2019.01); *G06F 16/2365* (2019.01); *G06F 16/27* (2019.01); *G06Q 30/0201* (2013.01); *G06Q 50/01* (2013.01); *H04L 51/16* (2013.01)

(58) Field of Classification Search
CPC ...... G06Q 10/10; G06Q 10/107; H04L 51/16; H04L 51/14; H04L 51/32; H04L 51/34; H04L 51/02; H04L 41/5061
See application file for complete search history.

(56) References Cited

U.S. PATENT DOCUMENTS

| | | | |
|---|---|---|---|
| 7,707,192 B1 * | 4/2010 | Lu | G06Q 10/00 707/687 |
| 2009/0150507 A1 * | 6/2009 | Davis | H04L 51/14 709/207 |

(Continued)

*Primary Examiner* — James A Edwards
(74) *Attorney, Agent, or Firm* — Krishnendu Gupta; Deepika Bhayana; Derek Lam (57) ABSTRACT

Methods, information handling systems and computer readable media are disclosed for prioritizing communications. In one embodiment, a method includes receiving, at a communications prioritization engine including a processor, communication data reflecting a communication. The communication data comprises source information representing a source of the communication. This method embodiment further includes identifying subject characteristic information within the communication data, and determining a subject characteristic score component using the subject characteristic information. The embodiment further includes determining a source score component using the source information and determining a response priority score using the subject characteristic score component and the source score component. The embodiment further includes determining, based on the response priority score, whether the communication data should be forwarded to a response function of the provider, and forwarding the communication data to the response function in response to a determination that the communication data should be forwarded.

20 Claims, 5 Drawing Sheets

(51) Int. Cl.
*G06F 16/22* (2019.01)
*G06F 16/23* (2019.01)

(56) References Cited

U.S. PATENT DOCUMENTS

| | | | |
|---|---|---|---|
| 2010/0332286 A1* | 12/2010 | Melamed | G06Q 10/10 705/7.32 |
| 2013/0158984 A1* | 6/2013 | Myslinski | G06F 16/951 704/9 |
| 2016/0142275 A1* | 5/2016 | Hendry | H04L 63/14 709/224 |
| 2016/0285816 A1* | 9/2016 | Schmid | H04L 51/02 |
| 2019/0179956 A1* | 6/2019 | Krasadakis | G06F 40/35 |
| 2019/0182195 A1* | 6/2019 | Avital | H04L 67/22 |

* cited by examiner

| Subject Characteristics Table 600 ||||
|---|---|---|---|
| Primary Characteristic | Sub-Characteristic | Relative Weight | Index |
| Pricing | Pricing negotiation | High | 5 |
| | Pricing comparison with competitor product | High | 5 |
| Efficiency | Efficiency compared to expectation | High | 5 |
| | Comparative efficiency with other products | High | 5 |
| Reliability | Fault tolerance in recommended usage | High | 5 |
| | Fault tolerance in non-tested use cases | High | 5 |
| | Ability of user to recover from mistake | High | 5 |
| Scalability | Scalability not achieved | High | 5 |
| | Scalibility comparison with competition | Medium | 3 |
| Performance | Performance in regular usage | High | 5 |
| | Performance in non-tested scenarios | High | 5 |
| | Performance comparison with competition | Medium | 3 |
| Maintainability | Upgrade use cases | High | 5 |
| | Licensing model | High | 5 |
| Usability | Documentation related | Low | 1 |
| | UI/CLI related | High | 5 |
| | Complexity of use | Medium | 3 |

*Fig. 6*

| Source Profile Table 700 ||||
|---|---|---|---|
| Source Type | Relationship Status | Revenue Band | Index |
| Enterprise | Existing long-term | High | 5 |
| | | Medium | 3 |
| | | Low | 1 |
| | New relationship | High | 5 |
| | | Medium | 5 |
| | | Low | 5 |
| | Prospective relationship | High | 5 |
| | | Medium | 5 |
| | | Low | 5 |
| Small & Medium | Existing long-term | High | 3 |
| | | Medium | 3 |
| | | Low | 1 |
| | New relationship | High | 5 |
| | | Medium | 5 |
| | | Low | 5 |
| | Prospective relationship | High | 5 |
| | | Medium | 3 |
| | | Low | 1 |
| Startup | New relationship | High | 5 |
| | | Medium | 5 |
| | | Low | 5 |
| | Prospective relationship | High | 5 |
| | | Medium | 5 |
| | | Low | 5 |

METHOD AND SYSTEM FOR PRIORITIZING COMMUNICATIONS RESPONSES

BACKGROUND

The present disclosure relates generally to networked information handling systems, and more particularly to prioritizing received communications for possible response.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Providers of products and services benefit from receiving feedback about those products and services from customers, consumers or other users. In addition to traditional service requests and surveys, feedback can come via many other channels, including electronic mail, social media posts and comments, and web page form entry. This potentially vast quantity of separate communications reaching a provider can make it difficult to determine the most critical communications for purposes of response.

SUMMARY

Methods, information handling systems and computer readable media are disclosed for prioritizing communications. According to one embodiment, a method includes receiving, at a communications prioritization engine including a processor, communication data reflecting a communication relating to a provider of a product or service. The communication data includes source information representing a source of the communication. This method embodiment further includes identifying subject characteristic information within the communication data, and determining a subject characteristic score component using the subject characteristic information. The embodiment further includes determining a source score component using the source information and determining a response priority score using the subject characteristic score component and the source score component. The embodiment further includes determining, based on the response priority score, whether the communication data should be forwarded to a response function of the provider, and forwarding the communication data to the response function in response to a determination that the communication data should be forwarded.

BRIEF DESCRIPTION OF THE DRAWINGS

The present disclosure may be better understood, and its numerous objects, features and advantages made apparent to those skilled in the art by referencing the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Figure 1:
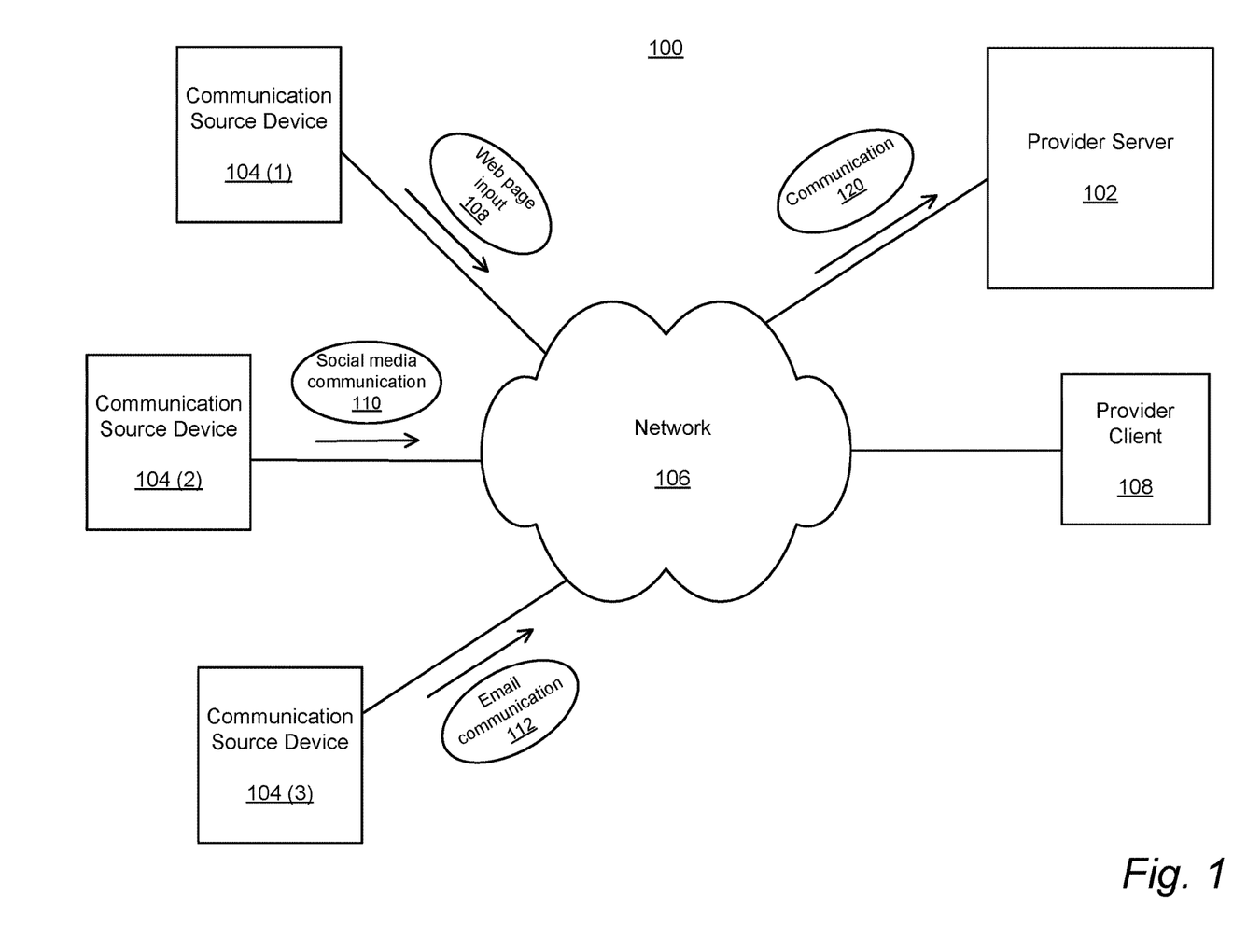
FIG. 1 is a block diagram illustrating an embodiment of a network environment including multiple information handling systems.

A network environment 100 including multiple networked information handling systems is shown in FIG. 1. Communication source devices 104(1)-(3), provider server 102 and provider client 108 are communicatively coupled to one another via network 106. Communication source devices 104(1)-(3), provider server 102 and provider client 108 are embodiments of an information handling system as described above, and may take any of the various forms described, including personal computers, tablet computers, smartphones, or servers, as appropriate. Provider server 102 is operated by or on behalf of a provider of a product or service. Possible entity forms for a provider may include, for example, companies, utilities, government officials or agencies, and charitable organizations. In an embodiment, communication source devices 104(1)-(3) are devices owned or operated by users of the provider's product or service. Depending on the nature of the provider, these users may have roles including but not limited to customers, consumers, clients and constituents with respect to the provider. Network 106 includes one or more networks suitable for data transmission, which may include local area networks (LANs), wide area networks (WANs), storage area networks (SANs), the Internet, or combinations of these. In an embodiment, network 106 includes a publicly accessible network, such as a public switched telephone network (PSTN), a DSL connection, a cable modem connection or large bandwidth trunks (e.g., communications channels providing T1 or OC3 service). Such networks may also include cellular or mobile telephone networks and other wireless networks such as those compliant with the IEEE 802.11 standards.

In the embodiment of FIG. 1, a web page input communication 108 is directed outward from communication source device 104(1). Communication 108 is generated when a user of communication source device 104(1) enters information via a user interface presented on a display of device 104(1). In an embodiment, the user interface is presented using a web browser program displaying a hypertext markup language (HTML) document. Data in communication 108 is sent via network 106 to a server hosting the HTML document. In one embodiment, the server hosting the HTML document is provider server 102. The HTML document may be implementing, for example, a comment form or customer support request site in such an embodiment. In another embodiment, the server hosting the HTML document is a third-party server (not shown) connected to network 106. A user interface provided by a third party server may be implementing, for example, an independent review website or an online forum relating to a product or topic.

A social media communication 110 directed outward from communication source device 104(2) is also shown in the embodiment of FIG. 1. Communication 110 is generated when a user of communication source device 104(2) enters information via a user interface presented on a display of device 104(2). In an embodiment, the user interface is provided in a similar manner to the user interface for web page input communication 108 described above. The information entered by a user for communication 110 is in the form of a post on a social media page, or a comment on such a post. An email communication 112 is shown directed outward from communication source device 104(3). In an embodiment, the email communication is directed to an email address assigned to the provider associated with provider server 102.

Communications 108, 110 and 112 represent selected examples of types of communications that can be generated by a communication source device 104. These do not constitute an exclusive list of the possible communications types. Other possible communications may include, for example, text messages or data derived from interactions with automated telephone response systems. In some embodiments, a communication may be sent automatically from one of communications source devices 104 without input from a user. This may happen in the case of automated problem reporting mechanisms in certain software applications. Automated communications may also be sent by "smart" appliances and other devices connected to the "Internet of things." Embodiments of the communications prioritization methods and systems disclosed herein may involve more or fewer types of communications than those shown in the embodiment of FIG. 1.

A generalized communication 120 is shown directed inward to provider server 102. Communication 120 may have any of the communication types shown in FIG. 1 or discussed above, and represents a communication from one of communication source devices 104(1)-(3) reaching provider server 102. In some embodiments for which communication 120 is an email or text message directed to the provider, communication 120 is directed to an address associated with provider server 102 or another provider server in communication with server 102. In some embodiments for which communication 120 is a social media post or input to a third-party web page, data representing communication 120 is retrieved by a retrieval or "crawler" program running on server 102. Provider client 108 is in communication with provider server 102 over network 106. In an embodiment, communication data processed according to methods and systems disclosed herein is forwarded to a client such as provider client 108 for response activities, such as contacting a source of a communication or addressing a problem with a provided product or service. In other embodiments, communication data may be forwarded to an additional provider server (not shown) for response activities, or response activity may be initiated at provider server 102.

Figure 2:
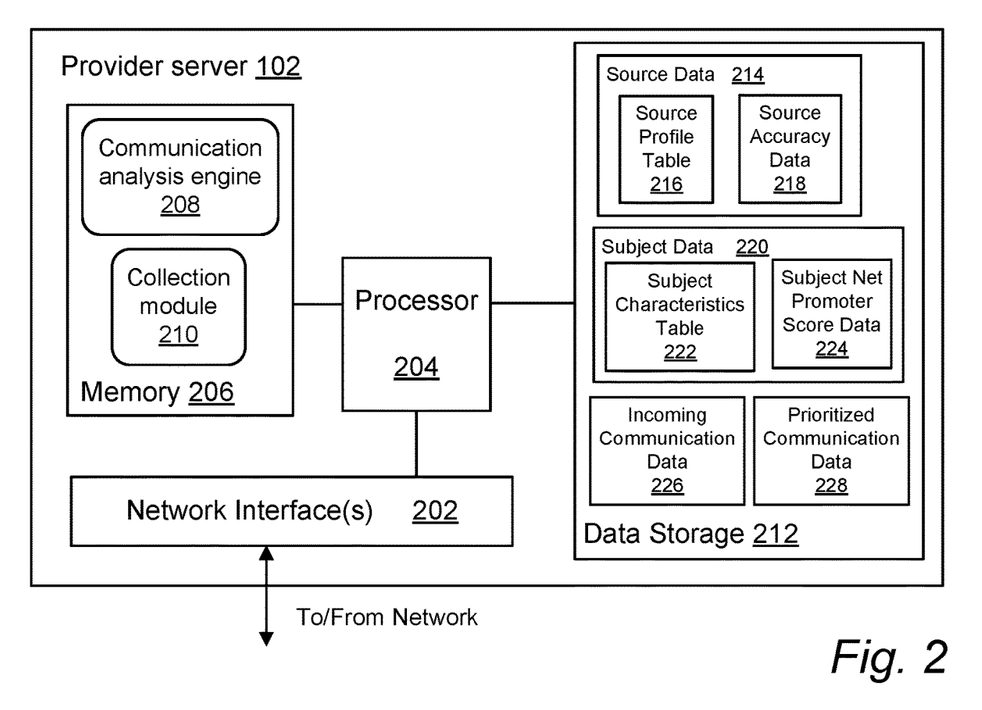
FIG. 2 is a block diagram illustrating certain components of an embodiment of an information handling system configured as a provider server.

A block diagram illustrating certain components of an embodiment of provider server 102 is shown in FIG. 2. Server 102 includes one or more network interfaces 202, a processor 204, memory 206 and data storage 212. Memory 206 stores program instructions that when executed by processor 204 implement a communication analysis engine 208 and a collection module 210. Data storage 212 stores source data 214, subject data 220, incoming communication data 226 and prioritized communication data 228. Network interface 202 is configured for both sending and receiving of data and control information within a network. In an embodiment, network interface 202 comprises multiple interfaces and can accommodate multiple communications protocols and control protocols. Memory 206 includes a plurality of memory locations addressable by processor 204 for storing program instructions and data used in program execution. As such, memory 206 may be implemented using any combination of volatile or non-volatile memory, including random-access memory (RAM) and read-only memory (ROM). In an embodiment, memory 206 is system memory for processor 204. Data storage 212 includes one or more integrated or peripheral mass storage devices, such as magnetic disks, optical disks, solid state drives or flash drives. In other embodiments, or at other times during operation of the embodiment of FIG. 2, some or all of the instructions shown in memory 206 may be stored in data storage 212, and some or all of the data shown in data storage 212 may be stored in memory 206.

Communication analysis engine 208 shown in memory 206 is configured to analyze data reflecting communications regarding a product or service of the provider associated with provider server 102. As discussed further below, analysis engine 208 includes instructions executable to determine a response priority score for each communication collected at provider server 102. As such, embodiments of analysis engine 208 include instructions executable to perform functions including parsing of text within communication data reflecting a communication, accessing of stored data relating to characteristics of a subject of the communication, accessing of stored data relating to a source of the communication, and calculation of score components and priority scores. In a further embodiment, engine 208 also includes instructions executable to determine whether a calculated response priority score exceeds a predetermined threshold for responding to the communication, where responses to the communication can include, for example, contacting the source of the communication or initiating action within the provider organization to address the subject of the communication.

Collection module 210 shown in memory 206 is configured for collection of communication data reflecting communications regarding the provider. In an embodiment, collection module 210 includes an email application program for obtaining communication data from email messages sent to the provider. In some embodiments, module 210 includes a text message application for obtaining communication data from text messages sent to the provider. Collection module 210 may also include web server functionality for hosting and collecting data from a support web site for users of the provider's product or service. In some embodiments the collection module includes web crawler or "scraping" programs for finding and retrieving communication data from social media networks or other third-party web pages. In other embodiments, some or all of these collection module functions are performed by a third-party service rather than in collection module 210. In such embodiments, communication data collected externally to provider server 102 is transmitted to provider service 102 for analysis by communication analysis engine 208.

Turning to data storage 212 shown within provider server 102, source data 214 represents data related to a source of a received communication. In the case of an email or text communication, the source of the communication is the sender of the email or text (or an organization that the sender represents). In the case of a communication in the form of a social media post or comment, the source of the communication is the poster of the post or comment to the social network, or an organization represented by the poster. Similarly, in the case of a communication in the form of web page input, the source of the communication is the user entering data into the web page (or an organization represented by the user). As noted above, the source of the communication may be, for example, a customer, consumer, client or constituent with respect to the provider associated with provider server 102. In embodiments for which a communication is initiated by a communication source device without human involvement, either the device itself or a user (or organization) associated with the device may be considered the source of the communication. For purposes of this disclosure it is assumed that communication data reflecting a communication includes an identifier of the source of the communication, or some information that can be used to identify the source. In the embodiment of FIG. 2, source data 214 includes a source profile table 216 and source accuracy data 218. Source profile table 216 assigns relative weighting to various factors relating to a particular communications source, as discussed further below in connection with, for example, FIG. 7. Source accuracy data 218 includes data reflecting an assessed accuracy of previous communications received from a particular communications source, as discussed further below in connection with, for example, FIG. 5.

Subject data 220 within data storage 212 represents data related to a subject of a received communication. In one embodiment, the overall subject of a communication is a particular product or service from the provider associated with provider server 102. In another embodiment, the subject of a communication is a particular problem or issue experienced by the source of the communication. In the embodiment of FIG. 2, subject data 220 includes a subject characteristics table 222 and subject net promoter score data 224. Subject characteristics table 222 assigns relative weighting to various factors, or characteristics, relating to the subject of the communication, as discussed further below in connection with, for example, FIG. 6. Subject net promoter score data 224 is data derived from surveys and related to a likelihood of users of a particular product or service to recommend that product or service, as described further below in connection with FIG. 4.

Incoming communication data 226 within data storage 212 stores communication data received at provider server 102, where the communication data reflects communications relating to the provider. In an embodiment, incoming communication data 226 is data collected by collection module 210. Incoming communication data 226 is in the form of a buffer in some embodiments, in which incoming communication data is stored until analyzed by analysis engine 208. As a result of analysis by engine 208, a unit of incoming communication data reflecting a particular communication may be, for example, stored elsewhere, forwarded to another device for response, discarded, or otherwise handled, as appropriate. Prioritized communication data 228 within data storage 212 stores communication data for which a response priority score has been determined by communications analysis engine 208. In an embodiment, the response priority score is stored along with the communication data for which it is calculated. Prioritized communication data 228 is in some embodiments sorted such that it is stored within a data structure in order of priority based on the response priority score. Such ordering may allow higher-priority communications to be preferentially forwarded to a response function of the provider. In some embodiments prioritized communication data 228 may include separate data structures for communication data representing communications having response priority scores falling into different ranges. In other embodiments, prioritized communication data 228 contains communication data representing only those communications having response priority scores at or above a predetermined threshold, with other communication data being discarded.

FIG. 2 illustrates an example of a provider server as described herein. Multiple alternatives and variations to the example of FIG. 2 will be apparent to one of ordinary skill in the art in view of this disclosure. Not all of the modules and data shown in FIG. 2 are present in every embodiment. For example, collection module 210 may not be present in an embodiment for which communication data collection is performed externally to provider server 102. As another example, subject net promoter score data 224 may not be used, particularly in embodiments for which the typical subject matter of received communications does not lend itself to availability of this type of data. Moreover, embodiments of a provider server contemplated herein may include additional components not shown, such as components discussed below in connection with FIG. 8. Software modules and engines described herein may take various forms understood to one of ordinary skill in the art in view of this disclosure. A single module or engine described herein may in some embodiments be implemented by a combination of multiple files or programs. Alternatively or in addition, one or more functions associated with modules or engines delineated separately herein may be combined into a single file or program.

Figure 3:
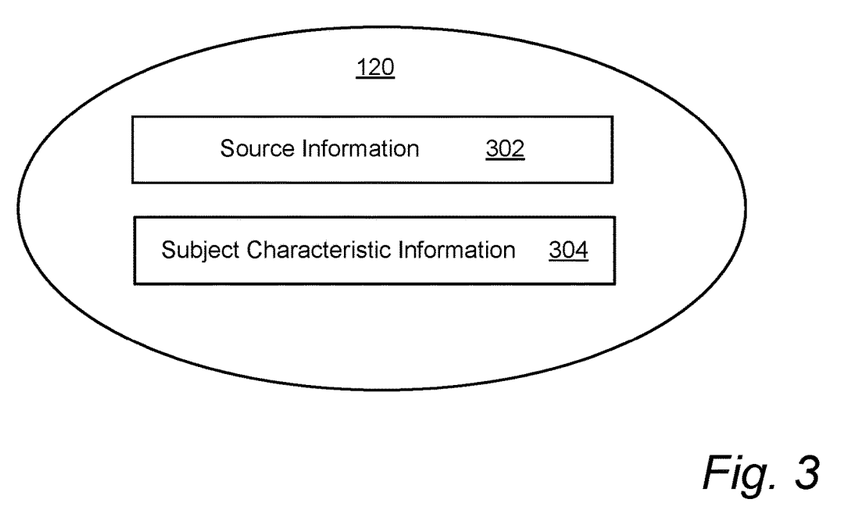
FIG. 3 illustrates an embodiment of a communication that may occur in the network environment of FIG. 1.

An illustration of types of information included in a communication 120 is shown in FIG. 3. In the embodiment of FIG. 3, communication 120 includes source information 302 and subject characteristic information 304. Source information 302 is information representing the source of the communication. In one embodiment, source information 302 is the personal or organizational name of the source. In another embodiment, source information 302 is a user identifier (user ID) or username for the source of the communication. In other embodiments, source information 302 includes other information from which the source of the communication can be determined. For example, source information 302 may include Internet domain, Internet Protocol (IP) address, or telephone number information in some embodiments. Depending upon the relationship between the provider and the source of the communication, source information 302 may include an identifier associated with that relationship, such as an account number. Subject characteristic information 304 is information relating to a subject of the communication, and particularly to aspects of the subject that are included in a subject characteristic data structure such as subject characteristics table 222 of FIG. 2. In some embodiments, some or all of the subject characteristic information may be in the form of structured data, such as data resulting from choosing options in a dropdown menu of a web page user interface. Alternatively, subject characteristic data may be included in free-form, or unstructured, text data. In such embodiments, processing of the text is required to identify the subject characteristic information.

Figure 4:
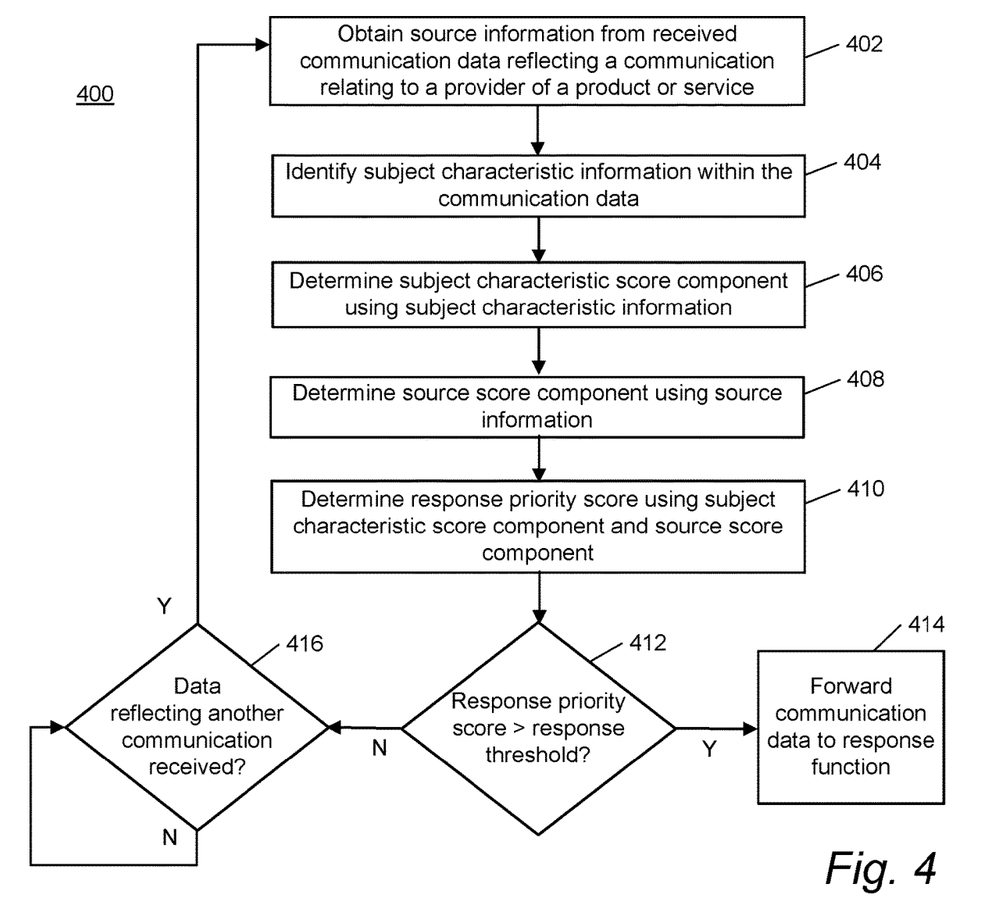
FIG. 4 is a flow chart illustrating an embodiment of a method for prioritizing communication responses.

A flow chart illustrating an embodiment of a method for prioritizing communications is shown in FIG. 4. In an embodiment, method 400 of FIG. 4 is performed by a communication analysis engine such as engine 208 of FIG. 2. Method 400 begins, in step 402, with obtaining source information from received communication data reflecting a communication relating to a provider of a product or service. In an embodiment, the received communication data is read from a data structure such as incoming communication data 226 of FIG. 2. In a further embodiment, data read from incoming communication data 226 was previously stored there by a collection module such as module 210 of FIG. 2. In an embodiment for which the communication represented by the communication data is an entry into a web page user interface, structured data from fields for entering identifying information such as name, account number, address, or telephone number may be available. In other embodiments, parsing of the communication data for information such as personal names, usernames, IP addresses or telephone numbers may be performed. In some embodiments, obtaining the source information includes accessing a data structure relating information found in the communication data to a name or other identifier of the source of the communication. In an embodiment, the source of the communication is obtained as, or converted to, an identifier that is useful in locating appropriate source profile data for use in determining a source score component, as discussed further below.

Method 400 continues in step 404 with identifying subject characteristic information within the communication data. As noted above in connection with subject characteristic information 304 in FIG. 3, subject characteristic information may be available as structured data in some embodiments. In other embodiments, parsing and/or other processing (such as natural language processing) of the communication data is performed to obtain subject characteristic information. In an embodiment, the processing includes searching the communication data for subject characteristics included in a subject characteristics table such as table 222 of FIG. 2. In such an embodiment, the processing may include searching for all characteristics included in a subject characteristics table. Alternatively, the processing may include ranking characteristics in order of importance, searching for more important characteristics first, and ending the processing if a certain number of characteristics are identified, before searching for all characteristics.

Figure 6:
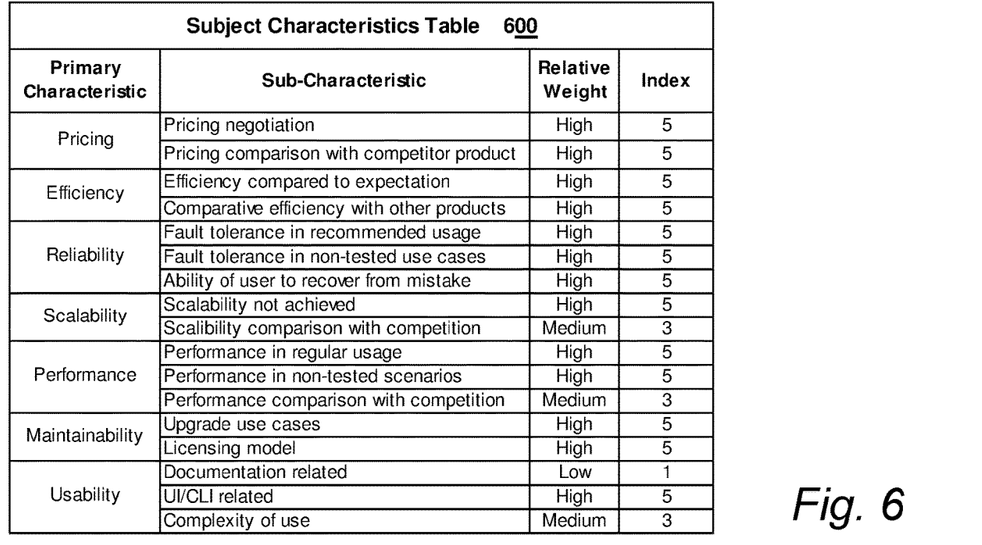
FIG. 6 illustrates an embodiment of a table containing characteristics data for a subject of a communication.

The subject characteristic information identified in step 404 is used in step 406 of determining a subject characteristic score component. In an embodiment, the subject characteristic score component is determined by accessing a subject characteristics table such as table 222 of FIG. 2. The contents of one embodiment of such a table are shown in FIG. 6. Subject characteristics table 600 of FIG. 6 includes primary characteristics and sub-characteristics of a subject of a communication. The characteristics and sub-characteristics shown in Table 600 are for an embodiment in which the subject of a communication is a product, particularly a software product for a large organization, or "enterprise." In other embodiments the subject of the communication may be instead be some other product or a service, including commercial services, noncommercial services, government services and so forth. The subject of the message could also be the provider more generally. In the embodiment of FIG. 6, each primary characteristic, such as Pricing, Efficiency, or Reliability, has associated sub-characteristics, such as (for the Reliability characteristic) "Fault tolerance in recommended usage," "Fault tolerance in non-tested use cases," or "Ability of user to recover from mistake." Each combination of primary characteristic and sub-characteristic is assigned a relative weight (in this case High, Medium or Low), which is translated into a numerical index (in this case 5, 3 or 1). In the embodiment of FIG. 6, higher index values represent a higher importance of the subject matter of a communication. The index values, along with all of the contents of table 600, are determined by the provider, and subject to adjustment in keeping with the provider's communication response strategy.

In one embodiment of using subject characteristics table 600 to determine a subject characteristic score component, a single numerical score in the index range of table 600 (between 1 and 5 in this case) is produced even if multiple subject characteristics are identified. This score can be produced, for example, by averaging the index values from table 600 for multiple combinations of primary characteristic and sub-characteristic, if multiple combinations are identified in step 404 of method 400 as part of the communication data. Alternatively, this type of score can be produced by selecting a single primary characteristic and sub-characteristic to represent the communication data, and using the single resulting index value as the subject characteristic score component. In an alternative embodiment of using table 600 to determine a subject characteristic score component, index values from multiple combinations of primary characteristic and sub-characteristic are added together, with a result that higher subject characteristic score components are determined for communications addressing multiple characteristics. The subject characteristic score component may also be referred to herein as a subject characteristics index, or a product characteristics index (PCI) in an embodiment for which the subject of the communication is a product.

Tables as described in this disclosure, including subject characteristics tables such as table 600, may have data arranged in multiple different ways, and may take the form of a database or some other data structure. For example, a subject characteristics table as described herein may be in the form of a database, where the database includes multiple sets of characteristics and corresponding index values, each corresponding to one of multiple possible communication subjects. In an embodiment for which the subject of a communication is typically a product, such a database could include multiple tables similar to table 600, each table for a different product offered by the provider. In general, multiple tables stored at one information handling device may in an alternative embodiment take the form of portions of a single table. Conversely, single tables described herein may in alternate embodiments be split into more than one data structure. "Table" as used herein may refer to a relevant portion of a table or other data structure, or to a collection of multiple tables or data structures holding related data. Embodiments of the tables described herein may also include other data not expressly shown, such as overall communication subject (e.g. product name).

Other variations of a subject characteristics table such as table 600 will be apparent to one of ordinary skill in the art in view of this disclosure. For example, some embodiments may include only one level of characteristics (e.g. including primary characteristics but not sub-characteristics). As another example, some embodiments may not explicitly include the qualitative weight of a characteristic. A different numerical scale could also be used for the index values in the table. The content of table 600 in the embodiment of FIG. 6 is but one example, and many variations of characteristics and assigned index values may be used, depending on the anticipated message subjects and the on the characteristics most important to the provider.

Figure 7:
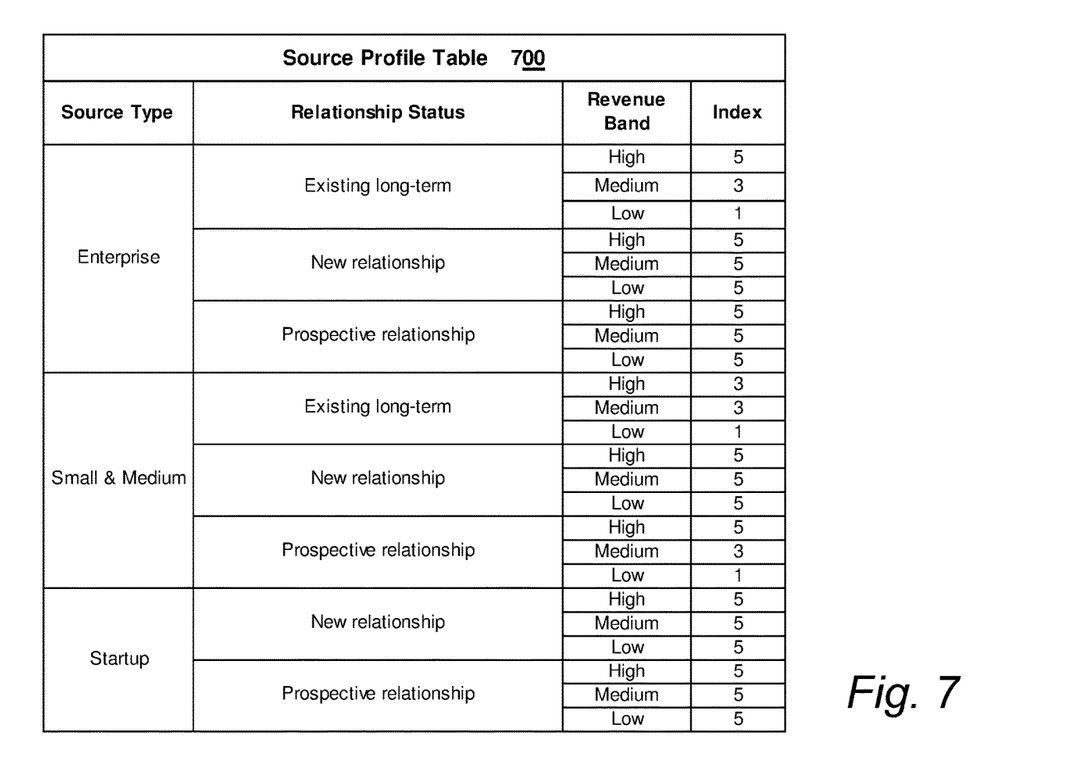
FIG. 7 illustrates an embodiment of a table containing profile data for a source of a communication.

Returning to method 400 of FIG. 4, the source information obtained in step 402 is used in step 408 of determining a source score component. One embodiment of a method for determining a source score component is illustrated by the flow chart of FIG. 5. Sub-method 500 of FIG. 5 begins in step 502 with determining a source profile index. In an embodiment, the source profile index is determined by accessing a source profile table such as table 216 of FIG. 2. The contents of one embodiment of such a table are shown in FIG. 7. Source profile table 700 includes columns for type of source, status of the relationship between the source and the provider, and relative revenue band of the source. Each combination of source type, relationship status and revenue band is assigned a numerical index (in this case, 5, 3 or 1). In the embodiment of FIG. 7, the source types shown in table 700 reflect a size of the communication source, including large organizations (enterprise) and small or medium organizations (which could include individuals). A "startup" type for recently established entities is also included. For each of the two different source size categories, three relationship statuses are included in table 700: existing, long-term relationship, new relationship, and prospective relationship. For the startup type, new relationship and prospective relationship statuses are included. Table 700 further includes relative revenue band options (high, medium and low) for each combination of source type and relationship status. In an embodiment, the revenue band reflects a relative size of the communication source's revenues, while the Enterprise and Small & Medium types would reflect a size in terms of personnel in such an embodiment. In the embodiment of FIG. 7, higher index values represent a higher importance of the source of a communication. The index values, along with all of the contents of table 700, are determined by the provider, and subject to adjustment in keeping with the provider's communication response strategy.

Like other tables described in this disclosure, alternative embodiments of a source profile table such as table 700 may have data arranged in multiple different ways, and may take the form of a database or some other data structure. For example, a source profile table as described herein may be in the form of a database, where the database includes multiple sets of source type and relationship data with corresponding index values, each set corresponding to one of multiple possible communication sources. As a further example, for a provider selling products, a source profile database could have data similar to that of table 700 for each of multiple customers. Other variations of a source profile table such as table 700 will be apparent to one of ordinary skill in the art in view of this disclosure. Not all of the data shown in table 700 is included in other embodiments, and other embodiments may include different or additional information. For example, some embodiments may not include revenue band information. Different source profile categories and a different numerical scale may be used, depending on the nature of the anticipated communication sources and the source attributes most important to the provider.

Figure 5:
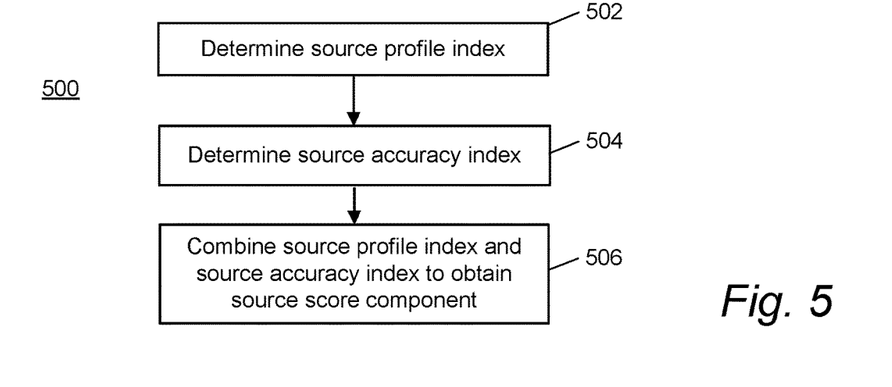
FIG. 5 is a flow chart illustrating an embodiment of a method for determining a source score component.

Returning to step 502 of FIG. 5, in one embodiment of determining a source profile index a single index value is obtained from the appropriate line of source profile table 700. In some alternative embodiments of a source profile table, communication source types may be included that allow a single communication source to correspond to multiple source types. In such an embodiment, one approach is to arrive at a single index value by selecting a single source type to use. Another approach is to arrive at a single index value by averaging the multiple index values resulting from considering multiple appropriate source types. Still another approach is to add the index values resulting from considering multiple appropriate source types, with a result that a higher source profile index is determined for communications from sources corresponding to multiple source types.

Method 500 for determining a source score component continues in step 504 with determining a source accuracy index. In an embodiment, the source accuracy index is determined using source accuracy data such as data 218 of FIG. 2. In an embodiment, the source accuracy data for a particular communication source includes yearly numerical assessments of the accuracy of communications received from that source during a given year. The source accuracy index in such an embodiment may be calculated as an average of the yearly accuracy assessments. As an example, for a source having three years of available accuracy assessments, and using integer values between 1 and 5 for the yearly accuracy assessment values, the source accuracy index may be calculated as follows:

$$\text{Source accuracy index} = (5+5+3)/3 = 4.67, \text{ where the accuracy assessments for the previous three years were 5, 5 and 3.}$$

The source accuracy index may also be referred to herein as an accuracy modifier index (AMI). Variations on the methods described herein for determining a source accuracy index will be apparent to those of skill in the art in view of this disclosure. For example, source accuracy data may in some embodiments be stored on a per-communication or per-interaction basis rather than on a yearly basis. In such embodiments, a source accuracy index could be determined as an average over the number of communications or interactions for which source accuracy data is available.

Method 500 continues at step 506 with combining the source profile index and source accuracy index to obtain the source score component. In an embodiment, combining of the source profile index and source accuracy index is done by multiplication. As an example, for an embodiment with a source profile index of 5 and a source accuracy index of 4.67, the source score component would be calculated as follows:

Source score component=5*4.67=23.35.

The source score component may also be referred to herein as a source credibility point, or as a customer credibility point (CCP) in an embodiment for which the source is a customer of the provider. Variations on the methods described herein for determining a source score component will be apparent to those of skill in the art in view of this disclosure. For example, in some embodiments a combination of the source profile index and the source accuracy index may be done using addition rather than multiplication. As another example, the source score component may in some embodiments reflect only one of the source profile index or source accuracy index rather than both of these indexes.

Returning to method 400 of FIG. 4, the subject characteristic score component and source score component described above are used in step 410 to determine a response priority score for the communication reflected by the received communication data. In an embodiment, the subject characteristic score component and source score component are multiplied in obtaining a response priority score. In another embodiment, an additional subject-related parameter is used in obtaining a response priority score. In a further embodiment, the additional parameter is a subject net promoter score. In a still further embodiment, the subject net promoter score is read from a data structure such as subject net promoter score data 224 of FIG. 2. A net promoter score (NPS) as used in this disclosure is an index ranging from −100 to 100 that measures the willingness of users to recommend a provider's products or services to others. The score is determined using a survey asking users to describe on a scale of 0 to 10 how likely they are to recommend a product or service to others. The percentage of users giving a rating between 0 and 6 is subtracted from the percentage of customers giving a rating of 9 or 10. A net promoter score for a particular product is referred to as a product net promoter score (pNPS). In an embodiment for which the subject of a communication is a product or service, a subject net promoter score may be available.

For an example in which the subject characteristic score component is 5, the source score component is 23.35 (as calculated in the example above) and the subject net promoter score is 32, an embodiment of the response priority score can be calculated as follows:

response priority score=(5*23.35)+32=148.75.

For an embodiment in which a single index value is selected from each of subject characteristics table 600 and source profile table 700, the index values range from 1 to 5 as shown in FIGS. 6 and 7, and the source accuracy index ranges from 1 to 5, the subject characteristic score component also has a range between 1 and 5 and the source score component calculated using method 500 of FIG. 5 has a range between 1 and 25. The product of the subject characteristic score component and the source score component ranges between 1 and 125 in this embodiment, and the response priority score as calculated above has a range between −99 and 225.

The response priority score may also be referred to herein as a feedback severity score. Variations on the methods described herein for determining a response priority score will be apparent to those of skill in the art in view of this disclosure. For example, the numerical ranges of the indices used in calculating the response priority score could be different in other embodiments, leading to a different range in possible values for the response priority score. As another example, the subject characteristic score component and source score component could be combined in a way other than by multiplication in some embodiments, such as by addition. As another example, a response priority score in some embodiments could be calculated by combining the subject characteristic score component and source score component, without including the subject net promoter score.

Method 400 continues in decision step 412, by determining whether the response priority score exceeds a predetermined response threshold. If the threshold value is exceeded ("yes" branch of step 412), the received communication data is forwarded to a response function of the provider (step 414). In an embodiment, the response priority score for the communication is forwarded with the communication data. "Response function" as used herein refers to a provider system configured to take some action in response to the received communication. The action may include, for example, communicating further with the source of the communication or changing the design of a product or service that is a subject of the communication. In an embodiment, forwarding the communication data to the response function includes forwarding the data to a provider client system such as client 108 of FIG. 1 or to an additional provider server. In other embodiments, the response function is implemented on provider server 102. Response function implementation may include, for example, storing the communication data in a data structure for access by an appropriate team within the provider organization. In some embodiments, response function implementation includes use of a machine learning module.

If the response priority score does not exceed the threshold value ("no" branch of step 412), no further action is taken with the corresponding communication data, in the embodiment of method 400. The communication analysis engine checks for communication data reflecting another communication (decision step 416), and starts the analysis again when new communication data is found ("yes" branch of step 416). In an embodiment, determining whether data reflecting another communication has been received includes checking an incoming communication data structure such as that represented by incoming communication data 226 of FIG. 2.

Variations on the method shown in FIG. 4 for prioritizing communications will be apparent to those of skill in the art in view of this disclosure. For example, another embodiment of a method could, instead of taking no action with communication data having a response priority score below a threshold, store all analyzed communication data in a data structure such as that represented by prioritized communication data 228 of FIG. 2. In one such embodiment, the analyzed communication data is stored in a data structure in order of priority score. Communication data reflecting higher-priority communications can then be forwarded to a response function before data reflecting lower-priority communications is forwarded. In a further embodiment, analyzed communication data is sorted into two or more groups based on priority score range, and data from separate groups is stored in separate data structures. Communication data from a data structure assigned to the highest-priority data can then be preferentially forwarded to a response function. In some embodiments, communication data being forwarded to a response function can be stored in a queue, so that data is forwarded on a continual basis as soon as a receiving device is ready for it. In other embodiments, communication data being forwarded to a response function is forwarded at preset time intervals, or at such time as a buffer or other data structure becomes full.

The methods and systems disclosed herein for prioritizing communications enable improvements to the operation of computer-implemented communication response systems. In the absence of the prioritizing disclosed herein, every received communication is typically forwarded to a response function, which can require excessive data storage capacity on the client device or server implementing the response function. Indiscriminate forwarding of all communication data to the response function may also create excessive bandwidth loading in the network and lower network performance. By determining relative priority of received communications, the methods and systems disclosed herein allow for lower-priority communications to be forwarded at times when network traffic is lower, if they are forwarded at all. Performance of the networked system of communication response is therefore improved. For embodiments in which the subject of a communication is typically a product, the methods and systems disclosed herein may also result in improved product development by providing more timely communications relating to specific aspects of a product or its performance that are considered particularly important by the provider.

Figure 8:
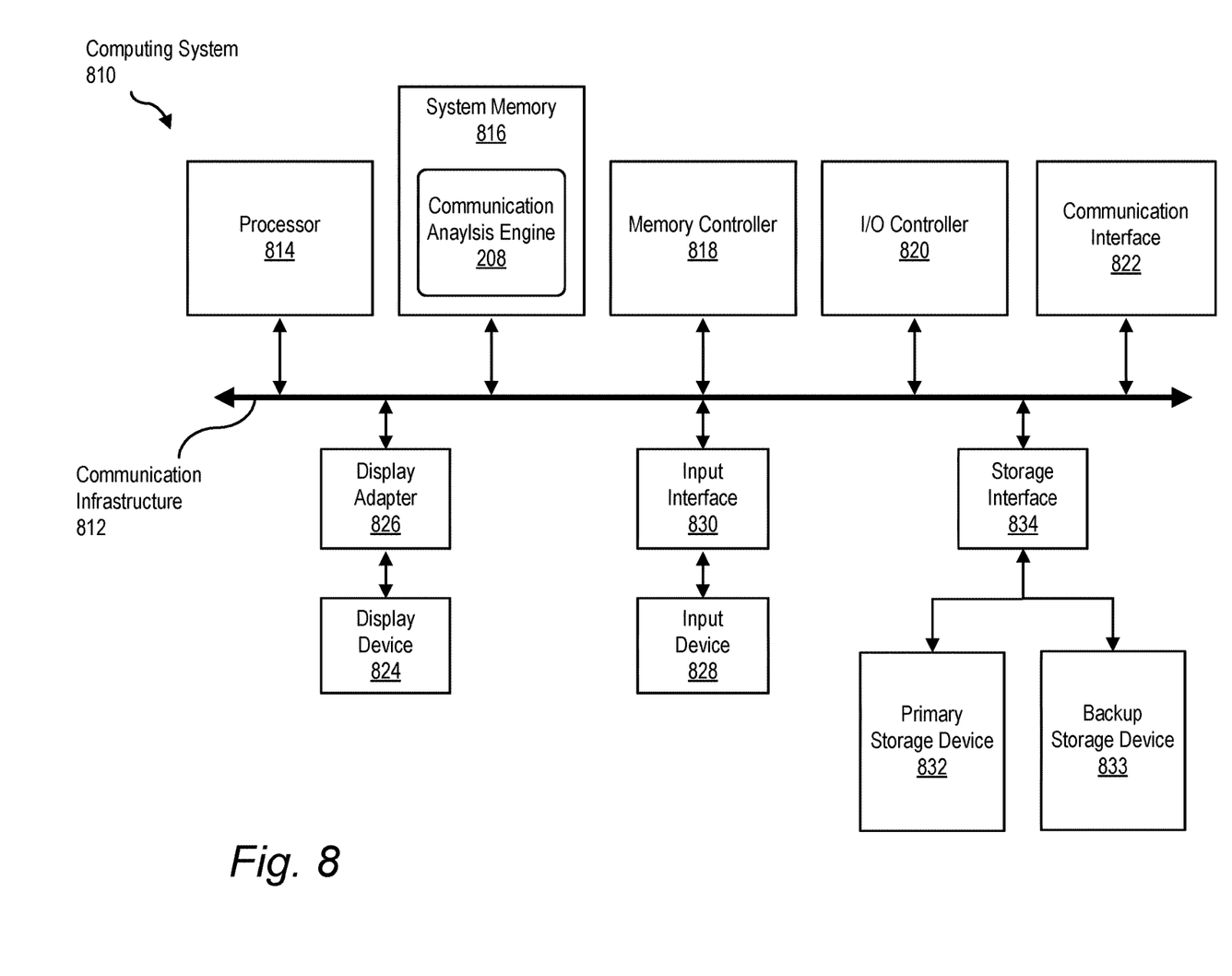
FIG. 8 is a block diagram illustrating an embodiment of an information handling system.

FIG. 8 depicts a block diagram of an information handling system 810 suitable for implementing aspects of the systems described herein. In the embodiment of FIG. 8, computing system 810 implements communication analysis engine 208. Embodiments of the computing system of FIG. 8 can, alternatively or in addition, implement various other engines and modules described in this disclosure. Computing system 810 broadly represents any single or multi-processor computing device or system capable of executing computer-readable instructions. Examples of computing system 810 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 810 may include at least one processor 814 and a system memory 816. By executing the software that implements communication analysis engine 208, computing system 810 becomes a special purpose computing device that is configured to perform message forwarding in manners described elsewhere in this disclosure.

Processor 814 generally represents any type or form of processing unit capable of processing data or interpreting and executing instructions. In certain embodiments, processor 814 may receive instructions from a software application or module. These instructions may cause processor 814 to perform the functions of one or more of the embodiments described and/or illustrated herein. System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. The ROM or flash memory can contain, among other code, the Basic Input-Output System (BIOS) which controls basic hardware operation such as the interaction with peripheral components. Although not required, in certain embodiments computing system 810 may include both a volatile memory unit (such as, for example, system memory 816) and a non-volatile storage device (such as, for example, primary storage device 832, as described further below). In one example, program instructions executable to implement a forwarding engine configured to forward messages using bit indexed explicit replication (BIER) may be loaded into system memory 816.

In certain embodiments, computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the operations or features described and/or illustrated herein. I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer) for display on display device 824. Computing system 810 may also include at least one input device 828 coupled to communication infrastructure 812 via an input interface 830. Input device 828 generally represents any type or form of input device capable of providing input, either computer or human generated, to computing system 810. Examples of input device 828 include, without limitation, a keyboard, a pointing device, a speech recognition device, or any other input device.

As illustrated in FIG. 8, computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may include a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810. A storage device like primary storage device 832 can store information such as routing tables and forwarding tables.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may be a part of computing system 810 or may in some embodiments be separate devices accessed through other interface systems. Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8.

Computing system 810 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 810 for storage in memory via a network such as the Internet or upon a carrier medium. The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the embodiments described and/or illustrated herein. Additionally or alternatively, one or more of the embodiments described and/or illustrated herein may be implemented in firmware and/or hardware. For example, computing system 810 may be configured as an application specific integrated circuit (ASIC) adapted to implement one or more of the embodiments disclosed herein.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

Although the methods and systems disclosed herein have been described in connection with several embodiments, they are not intended to be limited to the specific forms set forth herein. On the contrary, the disclosure is intended to cover such alternatives, modifications, and equivalents as can be reasonably included within the scope of the invention as defined by the appended claims.

What is claimed is:

1. A method of determining whether a provider of a product or service should respond to a communication, comprising:
 receiving, at a communication prioritization engine comprising a processor, a communication relating to the provider of the product or the service, wherein the communication comprises source information representing a source of the communication, and subject information relating to the product or service of the provider;
 assigning a source classification to the source of the communication using the source information included in the communication, wherein the source classification includes status of a relationship between the source and the provider of the product or service, and one or more additional classes including one or more of a source type and/or revenue of the source;

assigning a subject matter classification to the communication using the subject information relating to the product or service of the provider included in the communication, wherein the subject matter classification includes one or more classes including one or more of a pricing of the product or service, a performance of the product or service, a quality of the product or service, and/or reliability of the product or service;

determining a subject characteristic score component for the communication, where the subject characteristic score component is determined using the subject matter classification assigned to the communication;

determining a source score component for the communication, where the source score component is determined using the source classification assigned to the communication;

determining a response priority score for the communication, where the response priority score is determined using the subject characteristic score component of the communication and the source score component of the communication;

comparing the response priority score of the communication to a predetermined threshold, to determine whether the provider of the product or the service should respond to the communication; and if the response priority score of the communication exceeds the predetermined threshold, determining that the provider of the product or the service should respond to the communication and forwarding the communication data to the response function of the provider of the product or the service.

2. The method of claim 1, wherein determining the source score component further comprises:
determining a source profile index based on stored information characterizing the source of the communication.

3. The method of claim 1, wherein determining the source score component further comprises:
determining a source accuracy index based on stored information characterizing previous communications from the source of the communication.

4. The method of claim 2, wherein determining the source score component further comprises:
determining a source accuracy index based on stored information characterizing previous communications from the source of the communication; and
combining the source profile index and the source accuracy index to obtain the source score component.

5. The method of claim 1, wherein
assigning the subject matter classification comprises accessing a subject characteristic data structure; and
the subject characteristic data structure associates numerical values with respective characteristics of the subject matter classification of the communication.

6. The method of claim 2, wherein
the stored information characterizing the source of the communication comprises a source profile data structure; and
the source profile data structure associates numerical values with respective characteristics of the source of the communication.

7. The method of claim 3, wherein
the stored information characterizing previous communications from the source of the communication comprises a source accuracy data structure; and
the source accuracy data structure associates numerical values with assessed accuracy of previous communications from the source of the communication.

8. An information handling system comprising:
one or more processors;
a non-transitory computer-readable storage medium coupled to the one or more processors; and
a plurality of instructions, encoded in the computer-readable storage medium and configured to cause the one or more processors to
receive a communication relating to a provider of a product or service, wherein the communication comprises source information representing a source of the communication, and subject information relating to the product or service;
assign a source classification to the source of the communication using the source information included in the communication, wherein the source classification includes status of a relationship between the source and the provider of the product or service, and one or more additional classes including one or more of a source type and/or revenue of the source;
assign a subject matter classification to the communication using the subject information relating to the product or service of the provider included in the communication, wherein the subject matter classification includes one or more classes including one or more of a pricing of the product or service, a performance of the product or service, a quality of the product or service, and/or reliability of the product or service;
determine a subject characteristic score component for the communication, where the subject characteristic score component is determined using the subject matter classification assigned to the communication;
determine a source score component for the communication, where the source score component is determined using the source classification assigned to the communication;
determine a response priority score for the communication, where the response priority score is determined using the subject characteristic score component of the communication and the source score component of the communication;
compare the response priority score of the communication to a predetermined threshold, to determine whether the provider of the product or the service should respond to the communication; and
if the response priority score of the communication exceeds the predetermined threshold, determining that the provider of the product or the service should respond to the communication and forwarding the communication data to the response function of the provider of the product or the service.

9. The information handling system of claim 8, wherein the plurality of instructions is further configured to cause the one or more processors to:
determine a source profile index based on stored information characterizing the source of the communication, as a part of determining the source score component.

10. The information handling system of claim 8, wherein the plurality of instructions is further configured to cause the one or more processors to:

determine a source accuracy index based on stored information characterizing previous communications from the source of the communication, as a part of determining the source score component.

11. The information handling system of claim 9, wherein the plurality of instructions is further configured to cause the one or more processors to:
   determine a source accuracy index based on stored information characterizing previous communications from the source of the communication, as a part of determining the source score component; and
   combine the source profile index and the source accuracy index to obtain the source score component.

12. The information handling system of claim 8, wherein the plurality of instructions is further configured to cause the one or more processors to:
   access a subject characteristic data structure, as a part of determining the subject characteristic score component, wherein
   the subject characteristic data structure associates numerical values with respective characteristics of the subject of the communication.

13. The information handling system of claim 9, wherein
   the stored information characterizing the source of the communication comprises a source profile data structure; and
   the source profile data structure associates numerical values with respective characteristics of the source of the communication.

14. The information handling system of claim 10, wherein
   the stored information characterizing previous communications from the source of the communication comprises a source accuracy data structure; and
   the source accuracy data structure associates numerical values with assessed accuracy of previous communications from the source of the communication.

15. A non-transitory computer readable storage medium having program instructions encoded therein, wherein the program instructions are executable to:
   receive a communication relating to a provider of a product or service, wherein the communication comprises source information representing a source of the communication, and subject information relating to the product or service of the provider;
   assign a source classification to the source of the communication using the source information included in the communication, wherein the source classification includes status of a relationship between the source and the provider of the product or service, and one or more classes including one or more of a source type and/or revenue of the source;
   assign a subject matter classification to the communication using the subject information relating to the product or service of the provider included in the communication, wherein the subject matter classification includes one or more classes including one or more of a pricing of the product or service, a performance of the product or service, a quality of the product or service, and/or reliability of the product or service;
   determine a subject characteristic score component for the communication, where the subject characteristic score component is determined using the subject matter classification assigned to the communication;
   determine a source score component for the communication, where the source score component is determined using the source classification assigned to the communication;
   determine a response priority score for the communication, where the response priority score is determined using the subject characteristic score component of the communication and the source score component of the communication;
   compare the response priority score of the communication to a predetermined threshold, to determine whether the provider of the product or the service should respond to the communication; and
   if the response priority score of the communication exceeds the predetermined threshold, determine that the provider of the product or the service should respond to the communication and forward the communication data to the response function of the provider of the product or the service.

16. The non-transitory computer readable storage medium of claim 15, wherein the program instructions are further executable to:
   determine a source profile index based on stored information characterizing the source of the communication, as a part of determining the source score component.

17. The non-transitory computer readable storage medium of claim 15, wherein the program instructions are further executable to:
   determine a source accuracy index based on stored information characterizing previous communications from the source of the communication, as a part of determining the source score component.

18. The non-transitory computer readable storage medium of claim 15, wherein the program instructions are further executable to:
   access a subject characteristic data structure, as a part of determining the subject characteristic score component, wherein
   the subject characteristic data structure associates numerical values with respective characteristics of the subject of the communication.

19. The non-transitory computer readable storage medium of claim 16, wherein
   the stored information characterizing the source of the communication comprises a source profile data structure; and
   the source profile data structure associates numerical values with respective characteristics of the source of the communication.

20. The non-transitory computer readable storage medium of claim 17, wherein
   the stored information characterizing previous communications from the source of the communication comprises a source accuracy data structure; and
   the source accuracy data structure associates numerical values with assessed accuracy of previous communications from the source of the communication.

* * * * *